United States Patent [19]
Liu

[11] Patent Number: 5,707,200
[45] Date of Patent: Jan. 13, 1998

[54] FOUR-WHEEL HAND TRUCK WITH ELEVATOR

[76] Inventor: Jimmy Liu, 13803 Boros St., Orlando, Fla. 32837

[21] Appl. No.: 723,990

[22] Filed: Sep. 30, 1996

[51] Int. Cl.$^6$ ........................................................ B65G 7/00
[52] U.S. Cl. ........................ 414/490; 280/5.3; 280/47.24; 187/233
[58] Field of Search ........................ 414/490, 462; 187/232, 233, 235; 280/47.24, 47.26, 5.3; 254/2 R

[56] References Cited

U.S. PATENT DOCUMENTS

| | | | |
|---|---|---|---|
| 2,493,824 | 1/1950 | Noros | 187/232 |
| 2,714,462 | 8/1955 | Butler | 414/462 |
| 2,904,201 | 9/1959 | Rhodes | 414/462 |
| 3,052,323 | 9/1962 | Hopfeld | 187/232 |
| 3,199,692 | 8/1965 | Lébre | 187/232 |
| 3,873,118 | 3/1975 | Takagi | 280/47.24 |
| 3,896,904 | 7/1975 | Walker | 254/2 R |
| 4,049,083 | 9/1977 | Garvey | 187/232 |
| 4,728,245 | 3/1988 | Shelton | 414/490 |
| 4,737,065 | 4/1988 | Ju | 414/490 |
| 5,195,762 | 3/1993 | Pressly | 414/490 |
| 5,290,051 | 3/1994 | Olson | 414/490 |
| 5,419,672 | 5/1995 | Poe | 414/462 |

FOREIGN PATENT DOCUMENTS

| | | | |
|---|---|---|---|
| 664146 | 2/1988 | Switzerland | 414/490 |

*Primary Examiner*—Karen B. Merritt
*Assistant Examiner*—Douglas Hess
*Attorney, Agent, or Firm*—Brian S. Steinberger; Law Offices of Brian S. Steinberger

[57] ABSTRACT

A four wheel hand truck with elevator in which one pair of wheels are stationary as in a typical hand truck and the other pair of wheels are slidable upon vertical shafts and powered by a cable and winch assembly. A person can place the slidable pair of wheels on the outward edge of a pick-up truck bed and lower the entire hand truck and associated load to the ground or vice versa.

12 Claims, 3 Drawing Sheets

FOUR-WHEEL HAND TRUCK WITH ELEVATOR

BACKGROUND OF THE INVENTION

The present invention relates to four wheel hand trucks and more particularly to means and apparatus to facilitate the raising and lowering of a loaded four-wheel hand truck and its associated load from one level to another.

The common two-wheel hand truck is used extensively to handle heavy, rigid, box like loads, especially on a one man job. The body of such a truck consists of a pair of upright rails which are spaced apart by cross bars and these rails are tipped to hold a load at their front faces. A lip outstands from the bottom edge of the front faces of the rails to reach underneath a load to pick it up and to place it upon the rails when the truck is tipped. Two spaced apart Wheels are mounted upon a shaft at the back side of the rails and at the bottom of the truck so that when the truck is tilted, it will be upon these wheels. Finally, a handle is provided at the top of and at the back side, of each rail to enable an operator to hold the truck. In picking up a load the operator pushes the truck against the side of the box-like load and pushes the lip underneath it. He then tips the truck and the load rearvvardly to place the load upon the truck. So positioned, an operator can balance the load over the wheels and move the loaded truck to its destination. Such hand trucks are useful for moving loads across smooth level surfaces, but do not help the operator to lift or lower a load from the bed of a pick-up truck for example. Because of this, a job such as moving a stove or refrigerator necessitates the use of two or more people to lift or lower the load onto a typical flat bed truck. This need also arises for package handlers such as U.P.S. drivers who have to handle extra heavy boxes from time to time and can not, single handily manage to lift or lower a box-like package from the ground to the truck bed. An attempt to solve this problem is shown in U.S. Pat. No. 3,896,904 by Bruce Walker however, there is a serious problem with the Walder's design. Walker teaches a two wheeled hand truck in which a pair of legs are cranked down, in a telescoping fashion, from hollow openings formed by tubular vertical members at either side of the back of the hand truck. The proposed mechanism does indeed raise a load from ground level to the height of a truck bed, however, once the load is lifted the user must attempt to lift and lower the hand truck and its contents onto the truck bed. Lowering the legs while the Walker hand truck is fully loaded could also prove problematical. The legs must be extended while the user holds onto the handles of the hand truck creating a rather precarious situation. Needless to say, this product never made it to the market place.

OBJECTS OF THE INVENTION

It is an object of the present invention to provide a four wheeled hand truck with elevator which can be easily and safely operated by one person so that an individual can transport a heavy object such as a refrigerator, stove, washing machine or dryer from one location, onto a truck bed such as a pick-up truck and then down off the truck and to a second location. It is a further object of the present invention to provide a four wheeled hand truck with elevator which is capable of climbing stairs more easily than a conventional hand truck. Another object of the present invention is to provide a four wheeled hand truck in which the elevator portion is motorized using twelve volt D.C. power coming from a truck's electrical power supply. It is a further object of the present invention to provide a four wheeled hand truck with elevator in which a load such as a washing machine can be strapped to the hand truck and remain strapped and in an essentially upright position during all phases of transportation.

The above objects are accomplished by adding two shafts which are inboard and parallel to the outer upright structure of a standard hand cart. A carriage assembly rides on the upright shafts and a horizontal platform with a shaft and wheel at each end is attached to the carriage assembly. A winch located near the top of the hand truck contains a spool of cable, the end of which attaches to the carriage assembly. When electricity is applied to the motor, the cable lifts or lowers the carriage and attached wheels. To lift a loaded hand truck the operator places the carriage wheels on top of the tailgate or other outer most floor of a truck bed. Power is then applied to the motor and winch assembly causing the traditional wheels and floor of the hand truck to rise until the load is essentially level with the bed of the truck. The operator can then pull the loaded hand truck fully onto the truck bed and tie both the hand truck and load in place for safe transport. To lower the load, the user ties safety straps from the hand truck to hooks generally found on top of each side wall of a truck bed. Then the operator rolls the hand truck to the edge of the truck bed so that the traditional hand truck wheels are off the truck bed while the carriage wheels are still on the truck bed. With the hand truck and load safely tied, the operator then applies power to the winch causing the hand truck to lower until the hand truck wheels touch the ground. At this point the operator can remove the safety straps and roll. the hand truck and its load to its destination. The operator can untie the safety straps without fear of the load tipping over because, with all four wheels On the ground, the hand truck and load can remain in a slightly tilted yet stable condition. When negotiating stairs, an operator can use the extra set of Carriage wheels to "walk" the hand truck and load up or down the stairs. In this way a single person can easily and safely transport a heavy object such as a washing machine or refrigerator from one location, onto a truck bed, then off the truck bed, then up stairs if necessary, to its final destination.

These and other objects of the present invention Will be fully described in the drawings and description of drawings shown below. Although the following description shows a preferred embodiment of the present invention, it is to be understood that there may be other closely related means for performing many of the stated functions which will be known by those versed in the art and which will be covered by the spirit of this patent.

DETAILED DESCRIPTION OF THE DRAWINGS

Figure 1:
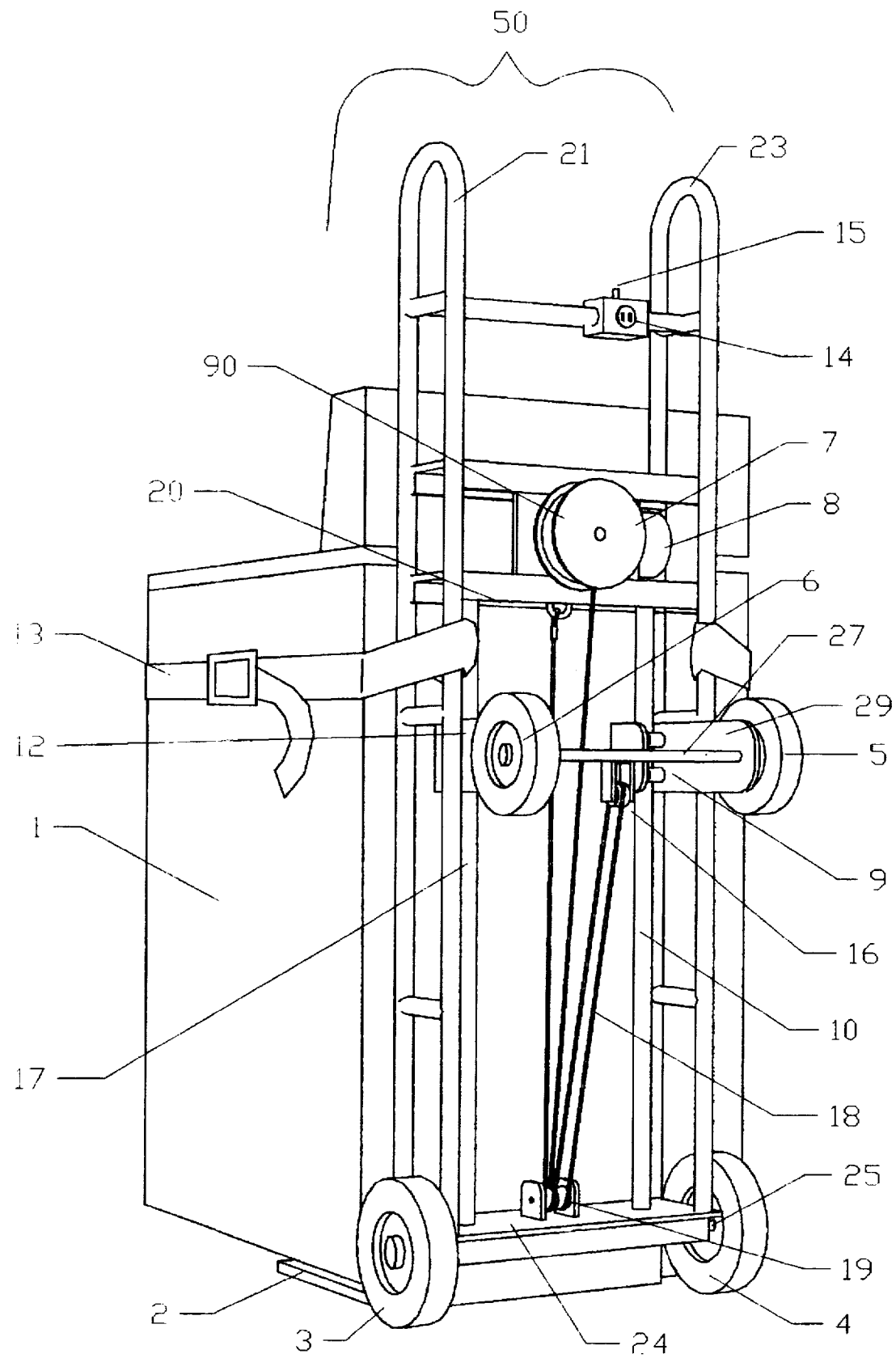
FIG. 1 is a perspective view of the four wheel hand truck with elevator of the present invention.

Referring now to FIG. 1 a load, in this case a washing machine 1 is strapped in place by strap 13 to the hand truck 50 of the present invention. The hand truck 50 is based on a conventional hand truck design in that it has a base plate 2, two upright members 21, 23 terminating in handle portions, two wheels 3, 4, attached by shaft 25 which is in turn attached to cross member 24. The additional features discussed below make the hand truck of the present invention unique and facilitate the objectives heretofore stated. A pair of wheels 6 and 5 are attached by shaft 27 to traveling horizontal plate 29. Slide assemblies 12 and 9 are attached to traveling horizontal plate 29 which travels up and down on vertical shafts 10 and 17. Shafts 10 and 17 start at lower horizontal plate 24 and terminate in upper horizontal plate 20. A common winch consisting of reel 7 and motor 8 are attached to cross plate 90. A cable 18 unwinds from reel 7 through pulleys 16 and 19 and terminates at horizontal plate 20. A switch box 14 contains a female receptacle for a twelve volt D.C. power cord and a switch 15.

Figure 2:
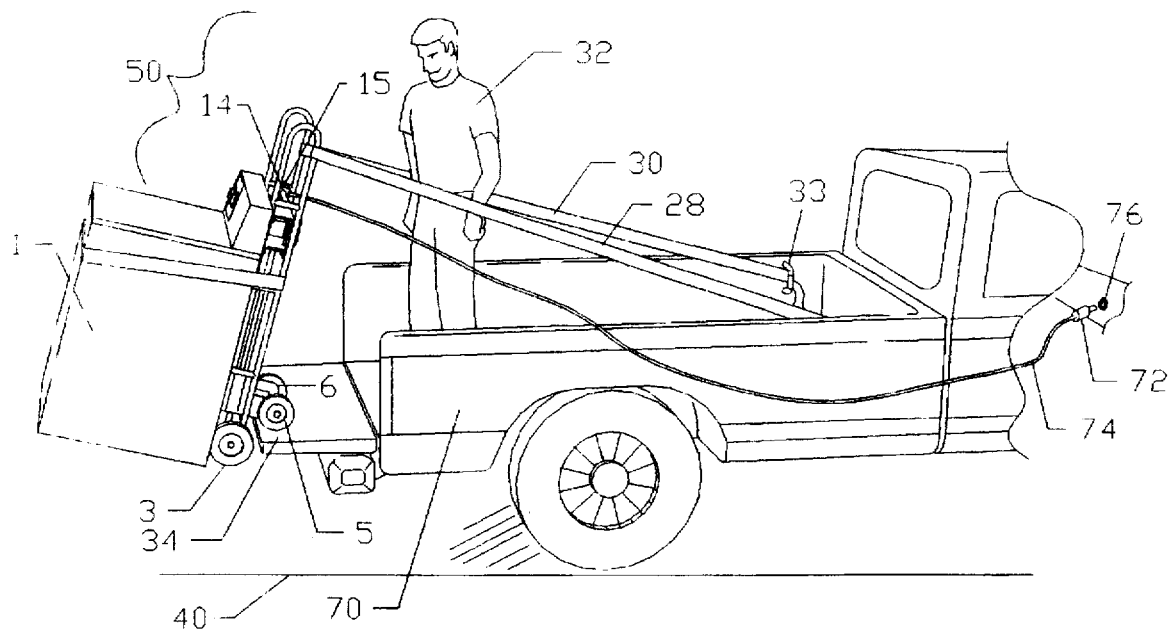
FIG. 2 is a perspective view of the present invention on top of the tail gate of a pick-up truck.
Figure 3:
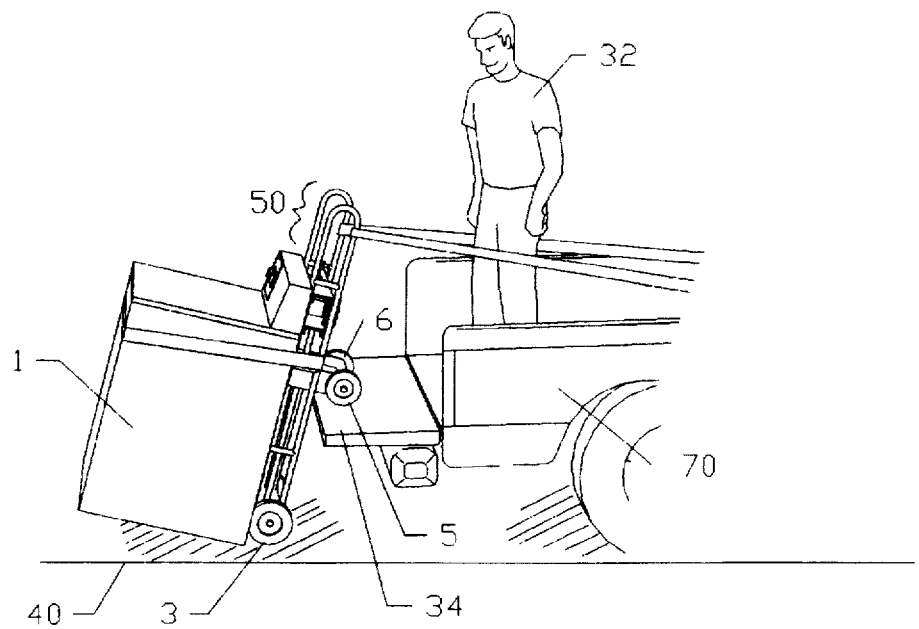
FIG. 3 is a perspective view of the present invention after the elevator has been lowered to ground level.
Figure 4:
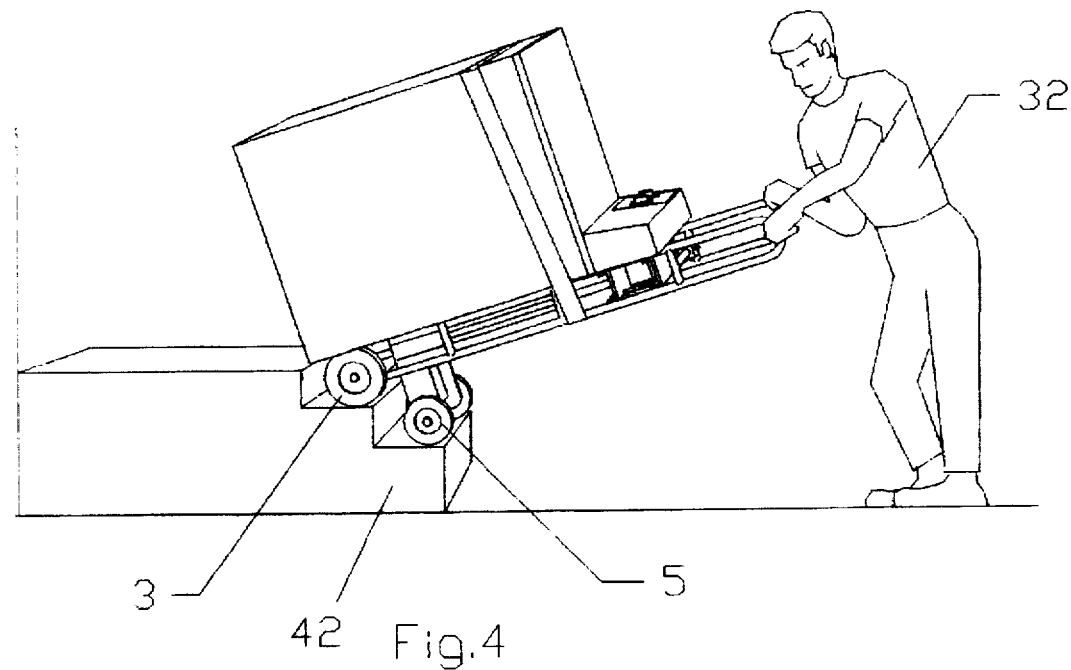
FIG. 4 is a perspective view of a person using the present invention to transport a load up a stairs.
Figure 5:
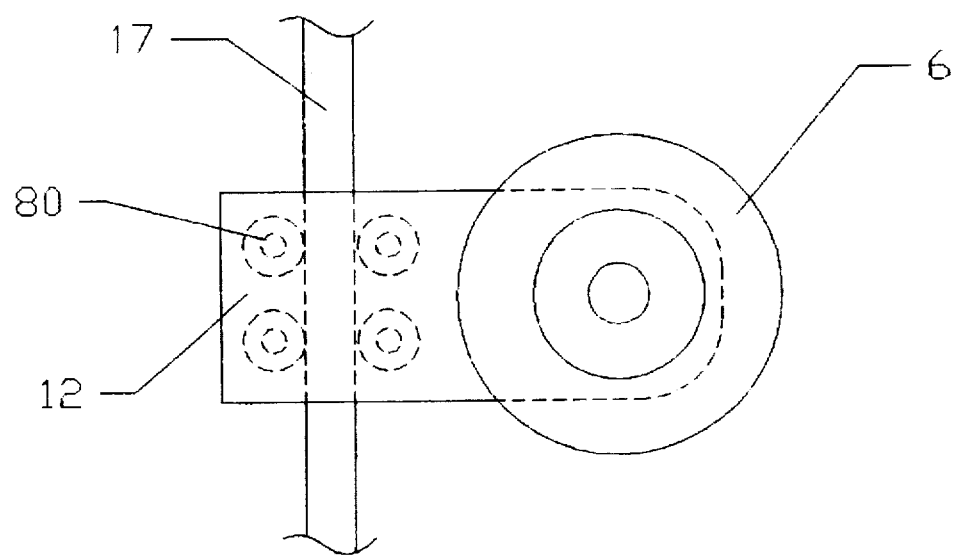
FIG. 5 is a detail side view of the slidable bearing assembly of the present invention.

FIG. 2 shows a person 32 standing on the flat bed of a pick-up truck. The person has fastened safety straps 28, 30 from the handle portion of the hand truck of the present invention to hooks which are commonly available on the inside walls of the pick-up truck cargo area. Standard hand truck wheel 3 is just off the edge of the tail gate 34 and slidable elevator wheels 12 are resting on the taft gate 34. Power cord 74 is plugged into receptacle 15 at one end and plugged into a conventional cigarette lighter receptacle 76 at the other end. When switch 14 is activated, the power winch causes the slidable horizontal plate 29 to rise on shafts 10 and 17 thereby causing the main part of the hand truck assembly 50 to lower until wheels 3 and 4 touch the ground at which point the user 32 turns off the winch and disconnects the safety straps 28, 30 and the power cord 74. The user is now ready to transport the load 1 to its final destination. If the destination involves climbing stairs as shown in FIG. 4 the user 32 can rock the hand truck from one set of wheels 3, 4 to the other set 5, 6 from one step to the other thereby making it easier to transport the load 1 up the stairs 42. FIG. 5 shows a detail of sliding assembly 12. Dotted lines indicate rollers 80 which act as bearings and carry the weight of whatever load is being transported.

While the invention has been described in connection with what are presently considered to be the most practical and preferred embodiment, it is to be understood that the invention is not limited to the disclosed embodiment, but, on the contrary, it is intended to cover various modifications and equivalent arrangements included within the spirit and scope of the appended claims.

I claim:

1. A four wheel handtrack with an elevator for lifting and lowering a load in and out of a vehicle, the handtruck comprising:

a single baseplate having a front edge and a rear edge, the baseplate for supporting a load;

a vertical frame having an upper end, a lower end, a front surface and a rear surface, the upper end having hand grips and the lower end of the front surface fixably attached to the rear edge of the single baseplate;

a first pair of wheels fixably attached to the lower end of the vertical frame for supporting both the single base plate and the frame above a ground surface;

a pair of parallel spaced shafts fixably attached to the rear surface of the vertical frame;

a second pair of wheels each wheel slidably mounted to each of the shafts; and motorized means for sliding the second pair of wheels up and down the shafts in unison, wherein the second pair of wheels when supported on a raised edge on a tailgate of a vehicle allows the load to be lifted in and lowered out of the vehicle.

2. The four wheel handtruck of claim 1, further comprising:

a winch and pulley assembly fixably attached to the rear surface of the vertical frame; and a cable having one end fixably attached to the vertical frame and a second end running through the winch and ptdley assembly and fixably attached to the second pair of wheels, wherein the motorized means pulls and retracts the second end of the cable through the winch and pulley assembly.

3. The four wheel handtruck of claim 1, wherein the second pair of wheels includes: a pair of slidable mounts each fixably attached to each of the second pair of wheels, wherein the pair of slidable mounts are each slidably mounted on each of the shafts.

4. The four wheel handtruck of claim 1, wherein both the first set of wheels and the set second set of wheels are freely rotatable.

5. The four wheel handtrack of claim 1, further comprising:

a power cord for electrically connecting the motorized means to a cigarette lighter in the vehicle.

6. The four wheeled handtruck of claim 1, further comprising:

a pair of straps for attaching the handtrack to the vehicle so that the handtrack will be stabilized as the handtruck is being raised and lowered.

7. A wheeled handtrack having an extra set of wheels which solely raises and lowers the entire wheeled handtruck comprising in combination:

a handtruck including:

a single baseplate for supporting a load;

a vertical frame having an upper end with hand grips and a lower end fixably attached to the single baseplate;

a first pair of freely rotatable wheels having axial supports that are fixably attached to the lower end of the vertical frame for supporting both the single base plate and the vertical frame above a ground surface;

a shaft means fixably attached to a rear surface of the vertical frame;

a second pair of freely rotatable wheels having axial support means, the axial support means being slidable on the shaft means; and means for sliding the axial support means of the second pair of wheels up and down the shaft means unison so that the handtruck itself moves relative to the second pair of freely rotatable wheels and their axial support means, and wherein supporting the second pair of wheels on a raised edge of the vehicle allows the load to be raised and lowered to the vehicle.

8. The wheeled handtruck of claim 7, wherein the shaft means includes:

a pair of parallel spaced apart shafts.

9. The wheeled handtruck of claim 7, wherein the means for sliding the axial support means of the second pair of wheels includes:

an electrical motor that can be powered by an electrical connection to a cigarette lighter in the vehicle.

10. The wheeled handtrack of claim 7, further comprising:

a winch and pulley assembly fixably attached to the rear surface of the vertical frame; and a cable having one end fixably attached to the vertical frame and a second end running through the winch and pulley assembly and fixably attached to the second pair of wheels, wherein a motorized means pulls and retracts the second end of the cable through the winch and pulley assembly.

11. The wheeled handtruck of claim 7, wherein the second pair of wheels includes:

a pair of slidable mounts each fixably attached to each of the second pair of wheels, wherein the pair of slidable mounts are each slidably mounted on the shaft means.

12. The wheeled handtrack of claim 7, further comprising:

a pair of straps for attaching the handtruck to the vehicle so that the handtruck will be stabilized as the handtrack is being raised and lowered.

* * * * *